June 24, 1969    H. N. STANLEY    3,452,155
DATA QUALITY CONTROL SYSTEM
Filed July 15, 1966
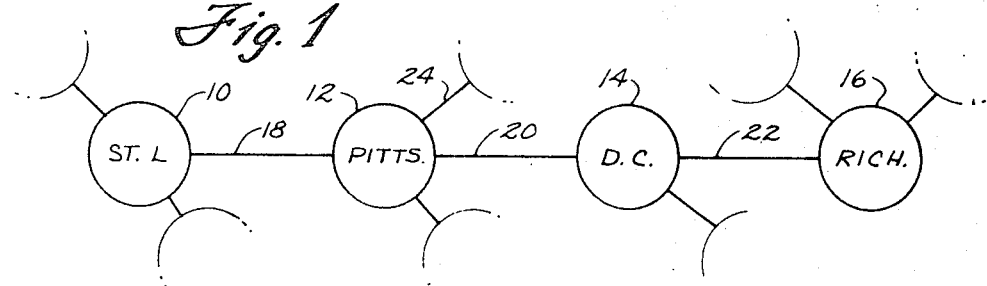
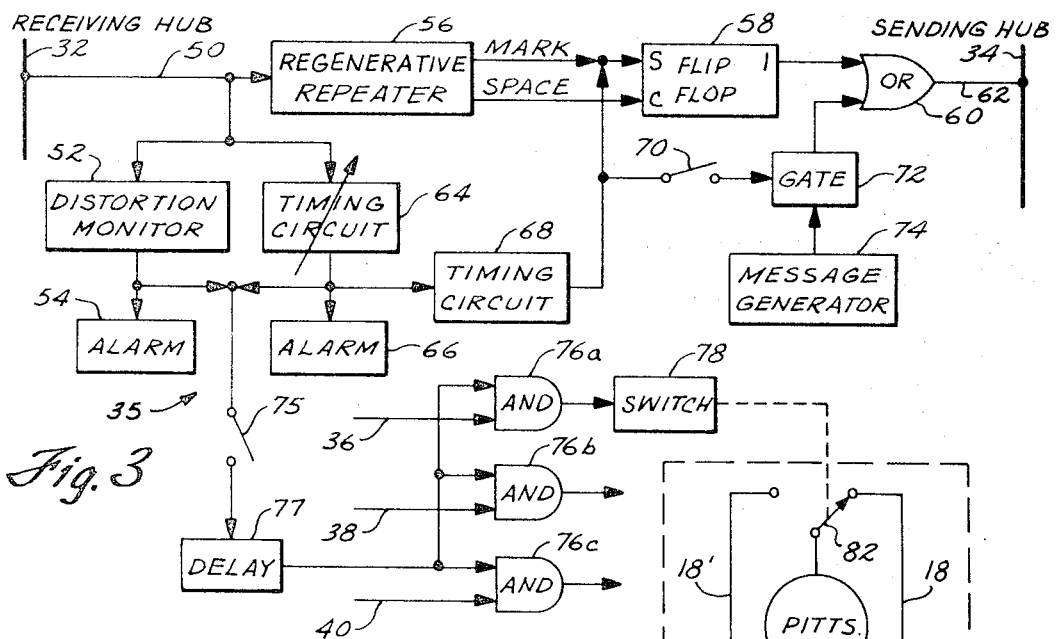
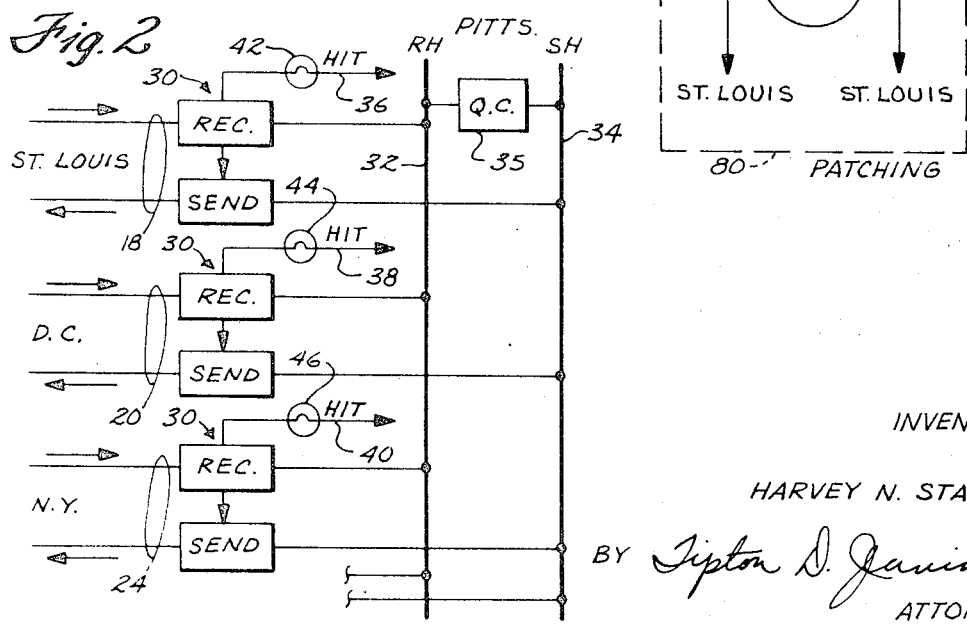
INVENTOR
HARVEY N. STANLEY
BY Tipton D. Jennings
ATTORNEY 3,452,155
DATA QUALITY CONTROL SYSTEM
Harvey N. Stanley, Falls Church, Va., assignor to The Susquehanna Corporation, a corporation of Delaware
Filed July 15, 1966, Ser. No. 565,421
Int. Cl. H04l 25/02, 15/00; H04q 9/00
U.S. Cl. 178—69                                                           2 Claims

ABSTRACT OF THE DISCLOSURE

There is shown and described a quality control system for improving the operation of Teletypewriter and data communication systems, A quality control system is connected between each receive hub and each send hub. The system receives the transmitted signals and retransmits them in undistorted form by means of a regenerative repeater. If an open should occur, the quality control system generates an idle or marking signal which is transmitted to the other points connected to the send hub, or, alternatively, a telegraph message is generated and sent to the other points so as to alert them of the occurrence and location of the open. Further features of the quality control system include the monitoring of distortion in the received signals and the operation of automatic patching equipment because of signal degradation or the occurrence of an open.

---

The present invention relates to a telegraph or data transmission system and, more particularly, to such a system in which the quality of the transmitted telegraph or data signals is controlled, and to a method for controlling such quality.

In present systems in which data or telegraph signals are transmitted between remote points, the quality of such signals is monitored by the use of equipment, such as distortion monitors and open detectors, which are placed in the transmission lines. In this manner, maintenance personnel can routinely determine the location and cause of trouble which adversely affects the performance of the system. In practice, however, the arrangement of equipment and the techniques employed in its utilization often fail to enable effective isolation or pinpointing of trouble because of the uncertainties and ambiguities encountered. Corrective action is therefore delayed, resulting in reduced performance or system outage for longer than reasonably necessary. As a result of this interrupted or inadequate service, the customers are dissatisfied and revenues are lost.

The present invention provides a quality control system which is designed to overcome the shortcomings of the present systems and accordingly:

It is an object of the present invention to provide a quality control system which improves the operation of data or telegraph communication systems;

Another object of the present invention is to provide such a quality control system in which communication system trouble can be readily and effectively located and corrected;

Another object of the present invention is to provide a method of controlling the quality of signals in a communication system so that trouble can be readily and effectively located and corrected;

A further object of the present invention is to provide a quality control system which effectively enables isolation of causes of communication system distortion and open conditions and a method for effecting such isolation;

Still another object of the present invention is to provide a quality control system which readily informs remote locations in the communication system that the source of trouble is not within their area of control;

Another object of the present invention is to provide an improved system which controls the quality of the communication system during operation, isolates causes of trouble when they occur, and takes corrective action where possible.

Other objects and advantages will become apparent from a reading of the following specification in conjunction with the accompanying drawings, in which:

FIGURE 1 shows in simplified form a communication system with which the present invention is used;

FIGURE 2 is a diagrammatic showing of the arrangement of equipment within a central office in the system of FIGURE 1; and FIGURE 3 shows a block diagram of the preferred form of the present invention which is used in cooperation with the communication system of FIGURES 1 and 2.

Broadly, the present invention encompasses a quality control system for improving the operation of Teletypewriter or data communication systems. The quality control system is located at key points in the communication system and receives the Teletypewriter or data signals being transmitted. The quality of the received signals is restored by the quality control system and the signals are retransmitted out to other points in the communication system. When an absence of an input signal exists for longer than a preset duration, means are actuated to apply an idle output signal condition to other points in communication system. This idle condition replaces the absence of signal which would normally be present and frees the communication circuit for use at the other points. An additional feature, upon selection, enables transmission of a telegraph message repeatedly to the other points in the system, the wording of the message being such as to alert the other points where the source of trouble is located. Further features provide for the monitoring of distortion in the received signals before the quality is restored, and the initiation of an automatic patching operation to replace faulty equipment which is causing the execessive distortion condition or the open condition.

In FIGURE 1, there is shown a communication system composed of three legs connecting serially the four cities St. Louis 10, Pittsburgh 12, Washington 14, and Richmond 16. The system can be considered a Bell System or Western Union private line Teletypewriter or data circuit. Each leg or line 18, 20, 22, connecting these cities is a half-duplex line, and each city is the central office having the receiving and sending hubs and other standard Teletypewriter circuit equipment.

To aid in an understanding of the present invention there is shown in FIGURE 2 a diagrammatic representation of a central office shown in FIGURE 1. Assuming that the central office shown is Pittsburgh, then the leg 18 from St. Louis, the leg 20 from Washington, and another leg 24 which is here shown to be connected to New York, all terminate at Pittsburgh in standard Teletypewriter equipment 30 which includes the receiving and sending apparatus. Each of the receivers is connected to a receiving hub 32, which is shown as a bus bar, and each of the sending apparatus is connected to a sending hub 34, also shown as a bus bar. Connecting the receiving hub 32 and sending hub 34 is block 35 containing a quality control system which will be discussed in detail in connection with FIGURE 3.

Connected to each receiver is a standard "hit" lead 36, 38, and 40 associated respectively with the St. Louis receiving leg, the Washington receiving leg, and the New York receiving leg. Each "hit" lead provides an output when its associated leg is receiving a telegraph message or is receiving an "open" or absence of signal. Each hit lead 36, 38, 40 also has a lamp 42, 44, 46, respectively connected thereto to provide the visual indication of a receiving or open condition.

When St. Louis is transmitting, the message is received on leg 18 by the receiving portion of the equipment 30 and after processing is applied to the receiving hub 32. The message passes through the quality control system 36 and appears on the sending hub 34. From there it is applied to the sending equipment associated with the D.C. leg 20 and the New York leg 24. The message is accordingly transmitted to D.C. and New York. The receiver portion of the equipment 30 associated with leg 18 prevents by conventional means (not shown) its sending apparatus from transmitting the message back to St. Louis. Similarly, when the message is received in Washington, D.C., and in New York City it will be processed by the standard Teletypewriter circuit equipment located at each of these points and sent out on other lines or loops to other remote points such as Richmond 16, shown in FIGURE 1.

Assuming for the present that the quality control system 35 is not connected between the receiving and sending hubs at each central office but is replaced by a direct connection, then if distortion occurs in the leg 18, distortion will be detected at all central offices connected in the teletypewriter circuit such as the central offices in Pittsburgh, Washington, Richmond, and New York. Similarly, with a discontinuity or open in leg 18, an open appears at all other points in the circuit. Obviously, with trouble originating in leg 18, points other than offices 10 and 12 are powerless to take any direct, corrective action. About all that a remote office can do is take measures to notify the adjacent offices that it is receiving distortion or a discontinuity, so that through a process of elimination, the location of the trouble can be pinpointed. Sometimes regenerative repeaters are inserted in the one or more legs of a circuit. While this approach removes the distortion from the signal and retransmits it distortion-free, it will not locate the cause of distortion or correct or locate the cause of discontinuities in the circuit.

In FIGURE 3 there is shown a quality control system which overcomes the aforedescribed communication system problems. The quality control system shown is located in each of the central offices 10, 12, 14, 16 as block 35 connected between each receiving hub 32 and sending hub 34 therein. As used herein, the term "quality" relates both to distortion and discontinuity characteristics of a signal, with a minimum or absence of both being the optimum quality condition; and the term "quality control" relates to the detection of distortion or discontinuities and corrective action to isolate or eliminate same.

With reference to all figures the system of FIGURE 3 will be described. Assuming that the quality of the signal being transmitted from St. Louis 10 has deteriorated by excessive distortion generated in leg 18, the signal will arrive at Pittsburgh 12 in a distorted condition, pass through the central office equipment, the receiving hub 32, and appear on line 50. From line 50 the incoming signal is applied to a conventional distortion monitor 52. If the distortion is greater than the acceptable percent distortion preset into distortion monitor 52, then the monitor 52 functions to trigger alarm circuit 54. An indication is therefore received in the Pittsburgh central office 12 that a distortion condition exists in the St. Louis-Pittsburgh leg, because only the lamp 42 (FIGURE 2) associated with this leg 18 is flashing. The other lamps 44, 46 are dark because no signal is being received by their associated equipment.

At the same time that distortion is being detected, the input signal is also applied to a regenerative repeater 56. This repeater receives the distorted input signal and restores it preferably to optimum quality by regenerating it with essentially zero distortion. The outputs of the repeater are labeled Mark and Space and these outputs are connected to inputs of a flip-flop 58. The output from the flip-flop 58 is taken from the One side, and is applied through an OR gate 60 to the output line 62 which is connected to the sending hub 34 in the central office at Pittsburgh 12.

When a mark output from regenerative repeater 56 sets flip-flop 58, a marking condition appears on the line 62. When a spacing condition clears the flip-flop 58, a space appears on line 62. The output on line 62, being the regenerated input signal, is distortion-free, and when transmitted out of Pittsburgh 12 on leg 20 to the Washington central office 14, and from there on line 22 to the Richmond office 16, it will be free of any distortion which may have been caused in the signal by conditions existing in leg 18. The distortion monitors 52 in the Washington office 14 and Richmond office 16 do not register distortion conditions originating in leg 18. In this way, the maintenance personnel at the remote points of Washington and Richmond are not required to undertake any corrective action to pinpoint or locate the cause of trouble. The cause of distortion is isolated between St. Louis and Pittsburgh.

Another type of trouble which can affect the quality of the transmitted signal is a discontinuity or "open." If an open occurs in leg 18, its effect at Pittsburgh 12 will be to remove all signal from receiving hub 32 and thus from line 50. This absence of signal will be applied to timing circuit 64. Because a spacing pulse and an open appear the same to timing circuit 64, this timing circuit has a duration which is set to be longer than the longest spacing pulse encountered during normal operation of the system. If the open is of sufficient duration to cause circuit 64 to time out, a second alarm circuit 66 is actuated. Because lamp 42 is illuminated by the open condition, and lamps 44 and 46 are dark, the maintenance personnel at Pittsburgh 12 know that the alarm is caused by an open condition present in leg 18.

An absence of signal caused by the open appears to the regenerative repeater 56 as a spacing input. Flip-flop 58 is cleared and spacing output is provided on line 62 and hub 34. The open is thus transmitted to other points such as to the Washington office 14 and from there to the Richmond office 16. Because these last two offices also have equipment such as shown in FIGURE 3, each of their timing circuits 64, after timing out, will actuate its alarm 66. Thus, their alarms will be actuated at approximately the same time that the alarm in Pittsburgh 12 is actuated. An open condition is registered in the Washington office 14 and the Richmond office 16.

Because the Washington office 14 and the Richmond office 16 are unable to take any corrective action with the open which originates in leg 18, there may be no reason to retain the legs 20 and 22 in an open and unusable state. A timing circuit 68 is provided which is actuated by timing circuit 64 simultaneously with the actuation of alarm 66. The output of timing circuit 68 is connected to the set input of flip-flop 58. Timing circuit 68 has a timing period of one second. After one second elapses, timing circuit 68 times out and sets and clamps the set side of flip-flop 58. The output of flip-flop 58 and line 62 and hub 34 go marking and are held there. A marking condition is transmitted from Pittsburgh and thus appears on leg 20 and finally on leg 22. Because a continuous marking condition is an idle condition, legs 20 and 22 are free to be used for transmission between Pittsburgh 12, Washington 14, and Richmond 16. The open has been terminated at Pittsburgh. Also other legs of the Teletypewriter circuit which may be tied into the hubs at these central offices are not taken out of service by the open condition in leg 18. Thus, only the leg 18 between St. Louis 10 and Pittsburgh 12 is taken out of service and the trouble is isolated to a single segment of the Teletypewriter circuit. The timing circuit 68 is provided to ensure that the open condition registers an open alarm in the other offices. This enables the other offices merely to be apprised that an open condition exists in the circuit. A minimum period of one second has been found to be sufficient.

If there is no necessity for freeing the Teletypewriter circuit when an open occurs, the circuit may be used to advise the other offices of the trouble spot. Switch 70 is closed to connect the output of timing circuit 68 to gate 72. Another input to gate 72 comes from a fixed message generator 74 of conventional construction. The output of gate 72 is applied to OR gate 60. In the absence of an open on line 50, there is no output from gate 72 and accordingly, no input to OR gate 60. In this manner, the output of flip-flop 58 controls the output of OR gate 60 so that output line 62 follows flip-flop 58. When an open condition actuates timing circuit 68 and it times out, flip-flop 58 is set and a mark condition is applied to OR gate 60. At the same time, gate 72 is opened and the fixed message from generator 74 is continuously transmitted through gate 72 to OR gate 60 and out onto line 62. The message generated is start-stop telegraph code so that with a mark input to OR gate 60 from gate 72, the output on line 62 is marking; and with a spacing input to OR gate 60 from gate 72, the output onto line 62 is spacing. Thus, a fixed message is transmitted from sending hub 34 onto the other legs such as leg 20 leading to the Washington office 14 and from there onto leg 22 to the Richmond office 16. This coded message is decoded by the Teletypewriter receiving equipment at these offices and informs the offices of the existing trouble. A sample message which can be used is "Open terminated at Pittsburgh," which is repeated until the trouble is obviated and regular transmission begins anew. In this manner, the trouble is not only isolated in the leg 18 between St. Louis 10 and Pittsburgh 12, but all offices in the Teletypewriter circuit are informed both of the type of trouble and where it is located.

When service on leg 18 is restored either by repairing or replacing the faulty equipment or line, St. Louis can transmit to Pittsburgh and the circuit is again complete. The arrival of a mark pulse on line 50 at the Pittsburgh station enables timing circuit 64 to return to its idle condition by recharging or the like. Alarm 66 and timing circuit 68 are released.

When timing circuit 68 is released, it also returns to its idle condition by recharging or the like. The clamp at the set side of flip-flop 58 is removed, permitting this flip-flop to follow the regenerative repeater. If switch 70 is shut and a message is being generated onto line 62 by generator 74, gate 72 will be closed when timing circuit 68 is released and this message will no longer be applied to the OR gate 60. Timing circuits 64 and 68 can in their simplest form be considered as conventional transistor switches having an RC circuit, formed of a storage capacitor and resistor, at the input. The capacitor is either in a charged or discharged state and the transistor switch is either held on or off.

This quality control system can also cooperate with existing patching equipment in use in present-day communication systems in a manner which will facilitate the automatic substitution of faulty lines or equipment. Closing switch 75 provides this feature. When a distortion or open condition is detected in the manner described above and either alarm 54 or alarm 66 is actuated, a signal is also applied to a plurality of coincidence gates 76. Gate 76a receives a second input on "hit" line 36 connected to the receiving equipment (FIGURE 2) associated with the line 18 on which the trouble is occurring. With signals being applied to both inputs of gate 76a, a signal appears at its output which operates switch 78.

Block 80 shows a schematic representation of one part of an automatic patching arrangement. Leg 18 normally connects Pittsburgh to St. Louis, as shown here and as also shown in FIGURE 1. Leg 18 is paralleled by another leg 18'. Contact 82 is controlled by switch 78 and can connect either leg 18 or 18' in service. When switch 78 is actuated, due to a faulty condition on leg 18, it moves contact 82 to its other position whereby leg 18' is connected to Pittsburgh. In this manner the faulty line 18 is removed from service and is replaced by line 18'. Although not shown here, a similar patching arrangement is in service at St. Louis. When leg 18 is removed from service at the Pittsburgh end, an open condition will be indicated at St. Louis 10 by its quality control system. Accordingly, the open alarm in its quality control system 35 will operate to actuate its switch 78 and thereby remove leg 18 from service at the St. Louis end and replace it with leg 18'. Leg 18' now serves as the half-duplex line connecting the two cities.

Because of the absence of signal on "hit" lines 38 and 40 associated with receiving equipment in other legs in the Pittsburgh office, coincidence does not occur at the other gates 76b and 76c. Other switches (not shown) which are a duplication of switch 78 are not affected. Thus the patching is limited to the trouble leg. Delay 77 positioned before the gates 76 is preferred in order to provide a time delay prior to automatic patching. This affords time for the various alarms and other described operations to occur. Also a delay enables time for correction or repair of trouble by maintenance men if the trouble is readily susceptible to such correction or repair. Furthermore, the fault may be caused by a temporary condition only. In either case if the trouble is corrected before the delay period expires, the automatic patching is avoided.

Alarms 54 and 66 which can be lights, bells, meters or other forms of indicators can be manually reset once trouble is corrected. It may be desirable to automatically terminate alarm 66 when timing circuit 64 is released as described previously. In regard to switch 78, manual reset is preferred because it may be untimely to restore in circuit the faulty equipment or line, such as leg 18, when the alarm actuating signal is removed.

The provision of a regenerative repeater 56 at each central office enables the preset distortion level at the distortion monitors to be kept at a low value, and small amounts of distortion are more readily detected. In the absence of regenerative repeaters, the distortion encountered in each leg of the communication circuit is cumulative and greater tolerance is necessary at the monitors 52, because the cumulative effect can cause large distortion levels. As a result, a less precise monitoring of distortion in each leg is effected. Otherwise, without a high preset level, alarms would ring at nearly all central offices in the Teletypewriter circuit. This additive effect also makes it more difficult to pinpoint just where the greater causes of distortion are located. An additional problem often encountered is in a frequency-shift keying (FSK) system where the bandwidths are quite narrow. High distortion levels can cause intermodulation between adjacent FSK channels. The present invention by reducing the level of distortion in the system reduces the likelihood of this intermodulation produced by distorted pulses.

What is claimed is:

1. A quality control system for use at separate or remote points in a data communication system, comprising input means and output means, said input means being adapted to apply data signals to said quality control system, means for restoring the quality of said data signals, said restoring means being connected between said input and output means to apply the restored signal to said output means, means for indicating an absence of said data signals for a period of time longer than a preset time duration, first timing means connected between said input means and said indicating means for establishing said preset duration, means responsive to the output of said timing means for applying an idle signal condition to said output means after the occurrence of an absence of said data signal for a period of time longer than the preset duration, means connected to said input means for monitoring the distortion of said data signals before their quality is restored by said restoring means, and switching means for initiating the replacement of data communication system equipment, said switching means being responsive to the output of said timing means so as to be actuated after the occurrence of an absence of said data signals for a period of time longer than the preset duration of said switching means being additionally responsive to the output of said monitoring means so as to be actuated by the occurrence of excessive distortion in said data signals.

2. In a system for transmitting data signals between a plurality of separate or remote points, a quality control system located at said points, each of said quality control systems comprising input means and output means, said input means being adapted to apply data signals to said quality control system, means for restoring the quality of said signals, said restoring means being connected between said input and output means to apply the restored signal to said output means, means for indicating an absence of said data signals for a period of time longer than a preset time duration, first timing means connected between said indicating means and said input means for establishing said preset duration, second timing means connected to the output of said first timing means, means responsive to the output of said second timing means for applying an idle signal condition to said output means, control means connected to the output of said second timing means, means for generating a coded message connected to the input of said control means, the output of said control means being connected to said output means to permit said message to be transmitted to said output means by said generating means so that the message can serve to advise other points that an open condition exists at one point, and selective means connected to said control means for enabling selection of the application of the idle condition or of the coded message to said output means when an open condition exists for a period of time longer than the time duration of said first and second timing means.

References Cited

UNITED STATES PATENTS

| | | |
|---|---|---|
| 1,982,022 | 11/1934 | Reeve. |
| 2,936,442 | 5/1960 | Christman et al. |
| 3,100,869 | 8/1963 | Disson et al. _____ 178—70 |
| 3,331,921 | 7/1967 | Neiswinter et al. |
| 3,331,922 | 7/1967 | Neiswinter et al. |

THOMAS A. ROBINSON, *Primary Examiner.*

U.S. Cl. X.R.

178—2; 340—147